(12) United States Patent
Daly et al.

(10) Patent No.: US 6,294,610 B1
(45) Date of Patent: Sep. 25, 2001

(54) COATING POWDERS FOR HEAT-SENSITIVE SUBSTRATES

(75) Inventors: Andrew T. Daly, Sinking Spring; Richard P. Haley, Reading, both of PA (US); Michael M. Cook, Boxford; Jeffrey A. Ulman, Beverly, both of MA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/450,395

(22) Filed: Nov. 29, 1999

(51) Int. Cl.$^7$ .................................................. C08F 8/00
(52) U.S. Cl. ................. 525/119; 525/176; 525/208; 525/438; 525/533; 525/934
(58) Field of Search .................. 525/438, 119, 525/176, 208, 533, 934

(56) References Cited

U.S. PATENT DOCUMENTS

| | | | |
|---|---|---|---|
| H1667 | 7/1997 | Poincloux et al. ................ | 525/438 |
| Re. 32,029 | 11/1985 | Pesata, Jr. et al. ............... | 525/438 |
| 3,723,568 | 3/1973 | Hoeschele ........................ | 260/835 |
| 3,723,569 | 3/1973 | Hoeschele ........................ | 260/835 |
| 3,859,379 | 1/1975 | Kitamura et al. ................ | 260/831 |
| 3,909,480 * | 9/1975 | Ogata . | |
| 3,966,836 | 6/1976 | de Cleur et al. ................. | 260/835 |
| 4,065,438 | 12/1977 | Verborgt ....................... | 260/75 R |
| 4,140,728 | 2/1979 | Hahn et al. ..................... | 260/835 |
| 4,145,370 | 3/1979 | Sreeves .......................... | 260/835 |
| 4,147,737 | 4/1979 | Sein et al. ...................... | 260/835 |
| 4,200,566 | 4/1980 | FitzGerald et al. .............. | 260/37 N |
| 4,211,691 | 7/1980 | FitzGerald et al. .............. | 260/42.21 |
| 4,223,097 | 9/1980 | Johannes et al. ................ | 525/107 |
| 4,307,153 | 12/1981 | Bernelin et al. ................ | 428/413 |
| 4,352,842 | 10/1982 | Kooymans et al. ............. | 427/385.5 |
| 4,365,046 | 12/1982 | Pesata, Jr. et al. ............. | 525/438 |
| 4,403,093 | 9/1983 | Hartman et al. ................ | 528/297 |
| 4,471,108 | 9/1984 | Belder et al. ................... | 528/272 |
| 4,499,239 | 2/1985 | Murakami et al. .............. | 525/111 |
| 4,528,341 | 7/1985 | Belder et al. ................... | 525/438 |
| 4,910,287 | 3/1990 | McLafferty et al. ............. | 528/272 |
| 5,006,612 | 4/1991 | Danick et al. .................. | 525/438 |
| 5,202,407 | 4/1993 | Pham et al. .................... | 528/89 |
| 5,250,634 | 10/1993 | Toyoda et al. .................. | 525/438 |
| 5,310,853 | 5/1994 | Pham et al. .................... | 528/89 |
| 5,321,100 | 6/1994 | Belder et al. ................... | 525/438 |
| 5,326,832 | 7/1994 | Belder et al. ................... | 525/438 |
| 5,360,886 | 11/1994 | Pham et al. .................... | 528/89 |
| 5,397,641 | 3/1995 | Moens et al. ................... | 428/357 |
| 5,407,707 | 4/1995 | Simeone et al. ................ | 427/410 |
| 5,436,311 | 7/1995 | Hoebeke et al. ................ | 525/174 |
| 5,439,988 | 8/1995 | Moens et al. ................... | 525/437 |
| 5,525,370 | 6/1996 | Hoebeke et al. ................ | 427/195 |
| 5,596,037 | 1/1997 | Moens et al. ................... | 524/539 |
| 5,637,654 | 6/1997 | Panandiker et al. ............. | 525/437 |
| 5,714,206 | 2/1998 | Daly et al. ..................... | 427/475 |
| 5,721,052 | 2/1998 | Muthia et al. .................. | 428/413 |
| 5,731,043 | 3/1998 | Horinka et al. ................. | 427/475 |
| 5,744,522 | 4/1998 | Prucnal et al. .................. | 523/442 |
| 5,824,373 | 10/1998 | Biller et al. .................... | 427/474 |
| 5,880,223 | 3/1999 | Shah et al. ..................... | 525/438 |

\* cited by examiner

Primary Examiner—Patricia A. Short

(57) ABSTRACT

Coating powders having a resin system of comprising an epoxy resin and a carboxylic acid functional polymer contain a cure catalyst of formulae (I), (II) or mixtures of (I) and (II):

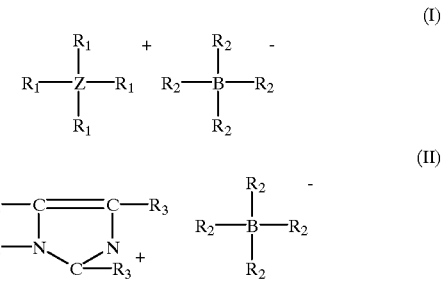

where Z is selected from P, As, and N, the $R_1$s are the same or different and are independently selected from alkyl groups, alkenyl groups, and aryl groups; $R_2$s are the same or different and are selected from alkyl groups, phenyl groups, substituted phenyl groups, Br, Cl, I, and F; and the $R_3$s are the same or different and are independently selected from the group consisting of H, alkyl groups, alkenyl groups, acyl groups, cycloalkyl groups, cycloalkenyl groups, aldehyde group, carboxyl group, cyano group and nitro group.

12 Claims, No Drawings

COATING POWDERS FOR HEAT-SENSITIVE SUBSTRATES

The present invention is directed to coating powders which fuse and cure at low temperatures and are therefore suitable for coating heat-sensitive substrates. The coating powders of the invention are based on an epoxy resin which cross-links with a carboxylic acid functional polymer

BACKGROUND OF THE INVENTION

Powder coatings, which are dry, finely divided, free flowing, solid materials at room temperature, have gained considerable popularity in recent years over liquid coatings for a number of reasons. For one, powder coatings are user and environmentally friendly materials, since they are virtually free of harmful fugitive organic solvent carriers that are normally present in liquid coatings. Powder coatings, therefore, give off little, if any, volatile materials to the environment when cured. This eliminates the solvent emission problems associated with liquid coatings, such as air pollution and dangers to the health of workers employed in coating operations.

Powder coatings are also clean and convenient to use. They are applied in a clean manner over the substrate, since they are in dry, solid form. The powders are easily swept up in the event of a spill and do not require special cleaning and spill containment supplies, as do liquid coatings. Working hygiene is, thus, improved. No messy liquids are used that adhere to worker's clothes and to the coating equipment, which leads to increased machine downtime and clean up costs.

Powder coatings are essentially 100% recyclable. Over sprayed powders can be fully reclaimed and recombined with the powder feed. This provides very high coating efficiencies and also substantially reduces the amount of waste generated. Recycling of liquid coatings during application is not done, which leads to increased waste and hazardous waste disposal costs.

In the past, most powder coating was performed on metals which can withstand high temperatures at which many conventional coating powders fuse and cure. Recently, however, several coating powders have been developed for substrates, such as wood, fiberboard, certain plastics, etc., which require coating powders which fuse (in the case of thermoplastic coating powders) or fuse and cure (in the case of curable coating powders) at relatively low temperatures. Examples of such coating powders are found, for example, in U.S. Pat. Nos. 5,824,373, 5,714,206, 5,721,052, and 5,731,043, the teachings of each of which are incorporated herein by reference. Low temperature coating prevents charring of the substrate and helps to prevent excessive outgassing of moisture.

One coating powder chemistry is based on glycidyl (meth)acrylate copolymers as the resin and a multifunctional carboxylic acid, e.g., monomer or polyester, as the cross-linking agent. Such coating powders are taught in U.S. Pat. No. 5,436,311, the teachings of which are incorporated herein by reference. The coating powders taught in U.S. Pat. No. 5,436,311 are primarily suitable for coating substrates, such as metal, which are not heat sensitive. Such coatings tend to exhibit good weatherability, and it would be desirable to utilize such coating powder chemistry for heat sensitive substrates. A general problem with producing coating powders for heat-sensitive substrates is the narrow temperature differential between extrusion temperatures and curing temperatures. The components of the coating powder composition must be heat-fusible in an extruder without substantial curing taking place. At the same time, they must fuse and cure at a temperature not a great deal higher so as to be useful for coating heat sensitive substrates. For example, extrusion temperatures may reach 200° F. (93° C.) while curing may be desired at 275° F. (135° C.).

Catalysts, such as phosphonium bromide, are utilized in low temperature-curing coating powders to speed up the cure and thereby permit curing at lower time/temperature parameters. However, catalysts also tend to promote unwanted pre-curing during the extrusion process. Such pre-curing is often expressed as increased gloss in the cured coating. For many applications, reduced gloss in a coating is a desired characteristic. Matting agents may be used, for example, to reduce gloss. Pre-curing of the coating powder during extrusion process counteracts measures to reduce gloss, such as matting agents.

Another epoxy which cross-links with carboxylic acid functional polyesters and which is commonly used in coating powders is triglycidyl isocyanurate (TGIC). An example of such a coating powder is found in U.S. Pat. No. 5,880,223, the teachings of which are incorporated herein by reference. The powder coatings in this patent are primarily suitable for conventional substrates, such as metals, although it is taught that with selection of an appropriate catalyst the composition is suitable for coating on wood. An example of such a catalyst is ethyltriphenylphosphonium bromide. It is found that phosphonium bromide salts tend to destabilize coating powders based on epoxy/carboxylic acid functional polyester chemistry particularly when the combined epoxy functionality and the combined carboxylic acid functionality of the polyester is high.

Other coating powders are based on epoxy resin and carboxylic acid functional acrylic resins. Examples of such powders are found in U.S. Pat. No. 5,744,522, the teachings of which are incorporated herein by reference.

SUMMARY OF THE INVENTION

Low temperature curing coating powders particularly suitable for coating heat-sensitive substrates comprise an epoxy resin and a carboxylic acid functional polymer, such as a carboxylic acid functional polyester or carboxylic acid functional acrylic resin. To achieve a low temperature cure, the combined functionalities of the epoxy resin and carboxylic acid functionality of the carboxylic acid functional polymer is desirably high, and to this end, the combined epoxy functionality of the epoxy and the combined carboxylic acid functionality of the carboxylic acid functional polymer is preferably at least 5, more preferably at least 7. The acid number of the carboxylic acid functional polymer is between about 20 and about 75. The epoxy equivalent weight of the epoxy resin is between about 200 and about 1000. The stoichiometric ratio of the epoxy functionality of the epoxy to the carboxylic acid functionality of the polymer is between about 0.7 and about 1.3, preferably between about 0.8 and about 1.2. The high combined functionality of the epoxy and the carboxylic acid functional polymer contributes to rapid cross-linking and thereby low temperature curing. Stability during and after extrusion is provided through the use of specific catalysts which are phosphonium-tetra-substituted borates, arsonium-tetra-substituted borates, ammonium-tetra-substituted borates, imidazole-tetra-substituted borates and mixtures thereof.

In accordance with one aspect of the invention, the catalyst for the coating powders are phosphonium, arsonium, ammonium and imidazole compounds of the general formulae (I), (II) or mixtures of (I) and (II):

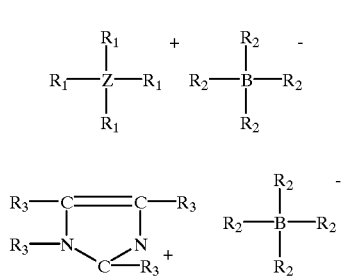

where Z is selected from P, As, and N, the $R_1$s are the same or different and are independently selected from alkyl groups, alkenyl groups, and aryl groups; $R_2$s are the same or different and are selected from alkyl groups, phenyl groups, substituted phenyl groups, Br, Cl, I, and F; and the $R_3$s are the same or different and are independently selected from the group consisting of H, alkyl groups, alkenyl groups, acyl groups, cycloalkyl groups, cycloalkenyl groups, aldehyde group, carboxyl group, cyano group and nitro group. Preferably Z is P. In accordance with certain novel aspects of the present invention, and in some cases preferred aspects of the invention, one or more, up to all four, of the $R_2$s are F.

DETAILED DESCRIPTION OF CERTAIN PREFERRED EMBODIMENTS

The term "phr" used herein is a weight measurement (parts per hundred resin) which relates to the total amount of the resin system of the coating powders, the resin system comprising the polyester resin A) plus the epoxy B) (100 parts total).

Polyesters resins A) useful in the present invention are linear or branched being formed of polyols and polyfunctional carboxylic acids (or monomers having both —OH and —COOH functionality). Carboxylic fuctionality is provided in excess over hydroxyl functionality, whereby the polyester chains are carboxyl terminated. The polyesters are relatively short chain having acid numbers of between about 15 and about 200, preferably between about 25 and about 90. A coating powder composition may comprise a mixture of polyesters.

Examples of suitable polyols for forming the polyester include 1,2-ethanediol, 1,3-propanediol, 1,4-butanediol, diethylene glycol, 1,6-hexanediol, neopentyl glycol, 1,10-decanediol, 1,4-cyclohexanedimethanol, trimethylolpropane, 2-methyl-1,3-propanediol, hydrogenated bisphenol A (or 2,2-(dicyclohexanol)propane), 2,2,4-trimethyl-1,3-pentanediol, 3-hydroxy-2,2-dimethylpropyl 3-hydroxy-2,2-dimethylpropanoate (CA. Reg. No. =115-20-4), and 1,12-dodecanediol, 2-methyl-2-hydroxymethyl-1,3-propanediol and 2-ethyl-2-hydroxymethyl-1,3-propanediol. Suitable polycarboxylic acids which may be used include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid and naphthalene dicarboxylic acid.

The polyesters have a carboxylic acid functionality of at least 1½, preferably at least 2, up to about 4. Polyesters useful in accordance with the invention may be formed from hydroxyl terminated polyesters which are then capped with a polyfunctional carboxylic acid. A linear hydroxyl-terminated polyester capped with a dicarboxylic acid will have a functionality of 2. A linear hydroxyl-terminated polyester capped with a tricarboxylic acid, such as trimellitic anhydride, will have a functionality of 4. The introduction of branching into the polyester, e.g., through the use of trimethylolpropane, or trimellitic anhydride as monomers, will permit even higher carboxylic acid functionality to be achieved.

Polyester useful in the invention have glass transition temperatures ($T_g$s) of at least about 40° C., preferably at least 50° C., up to about 65° C. The polyesters typically have weight average molecular weights ranging from about 2000 to about 5000. The polyesters may range from amorphous to highly crystalline.

Coating powders in accordance with the invention may also comprise carboxylic functional acrylic polymers. Acrylic polymers are used having acid numbers between about 15 and about 200, the high acid number of the acrylic polymers promoting rapid cross-linking and thereby low temperature curing. Carboxylic acid functional acrylic polymers for used in the invention have weight average molecular weights between about 1000 and about 20,000. For use in coating powders, acrylic polymers should have glass transition temperatures ($T_g$s) ranging from about 40° C. to about 65° C. and softening temperatures between about 60° C. and about 80° C. A coating powder composition may contain mixtures of acrylic polymers.

Acrylic polymers are typically derived from a mixture of acid functional monomers and non-acid functional monomers. Some specific examples of suitable acid functional monomers are acrylic acid, methacrylic acid, maleic acid, fumaric acid, and citraconic acid. One or more of such acid functional monomers may be used to form the acrylic polymer.

The acid functional monomers are typically copolymerized with non-acid functional monomers, such as esters of acrylic acids, for example, methyl acrylate, 2-ethyl hexyl acrylate, n-butyl acrylate, n-hexyl acrylate, methyl methacrylate, hydroxy ethyl acrylate, butyl methacrylate, octyl acrylate, 2-ethoxy ethyl methacrylate, t-butyl acrylate, 1,5-pentanediol diacrylate, N,N-diethylaminoethyl acrylate, ethylene glycol diacrylate, 1,3-propanediol diacrylate, decamethylene glycol diacrylate, decamethylene glycol dimethacrylate, 1,4-cyclohexanediol diacrylate, 2,2-propane diacrylate, glycerol diacrylate, tripropylene glycol diacrylate, glycerol triacrylate, 2,2-di(p-hydroxyphenyl)-propane dimethacrylate, triethylene glycol diacrylate, polyoxyethyl2-2-di(p-hydroxyphenyl)-propane dimethacrylate, triethylene glycol dimethacrylate, polyoxypropyltrimethylol propane triacrylate, ethylene glycol dimethacrylate, butylene glycol dimethacrylate, 1,3-propanediol dimethacrylate, butylene glycol dimethacrylate, 1,3-propanediol dimethacrylate, 1,2,4-butanetriol trimethacrylate, 2,2,4-trimethyl-1,3-pentanediol dimethacrylate, pentaerythritol trimethactylate, 1-phenyl ethylene-1,2-dimethacrylate, pentaerythritol tetramethacrylate, trimethylol propane trimethacrylate, 1,5-pentanediol dimethacrylate, and 1,4-benzenediol dimethacrylate; styrene and substituted styrene, such as 2-methyl styrene and vinyl toluene and vinyl esters, such as vinyl acrylate and vinyl methacrylate to provide the desired acid number.

Suitable polyepoxy compounds as curatives B) include heterocyclic polyepoxides such as triglycidylisocyanurate (TGIC); polyepoxides of aromatic polyols such as the diglycidyl ether of bisphenol A; cycloaliphatic polyepoxides; glycidyl esters of aromatic or aliphatic polyacids, such as the diglycidyl ester of hexahydrophthalic acid; low equivalent weight epoxy-functional acrylic resins; polyepoxides of aliphatic polyols such as the diglycidyl ether of 1,4-butanediol; and polyepoxides of amino-alcohols, such as the tri-glycidyl ether-amine of 4-amino phenol. Other aromatic polyols which may be used to prepare glycidyl ethers include such species as bisphenol F, and tetrabromobisphenol A, and the like. Polyepoxides from this category also include low molecular weight polymers derived from the above-named aromatic diols and their diglycidyl ethers. Cycloaliphatic polyepoxides include such compounds as 3',4'-epoxycyclohexylmethyl-3,4-epoxycyclohexyl carboxylate and dicyclopentadiene dioxide and the like.

Epoxies used in the invention have epoxy functionalities of at least two, preferably at least about 3, up to 16. Epoxies useful in coating powder compositions should be solid at room temperature and have melting points above about 40° C.

For coating powders to be used at low temperatures, such as for coating wood or heat-sensitive plastics, it is preferred to use as the epoxy resin, epoxy-functional acrylic resins, such as glycidyl methacrylate copolymer (GMA resins). Epoxy equivalent weights of such polymers should range from about 200 to about 1000, preferably between about 200 and about 600. Weight average molecular weights of such epoxy functional acrylic polymers is between about 200 and about 2000; $T_g$s range between about 40 and about 60° C., and softening points range between about 55 and about 75° C.

Glycidyl esters of aromatic and aliphatic polyacids include glycidyl esters of such polyacids as, for example, terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, and methylhexahydrophthalic acid. These monomers may be co-polymerized with other α,β-ethylenically unsaturated monomers mentioned above with respect to carboxylic acid functional acrylic resins.

Again, fast cure is achieved by the combined epoxy functionality of the epoxy plus the carboxylic acid functionality of the polyester being preferably at least 7, more preferably at least 10, most preferably at least 12.

The coating powder may be clear, i.e., non-pigment-loaded, or may contain up to 200 wt % (200 phr) (though generally 120 wt % (120 phr) or less) of filler and/or pigment. In addition, the coating powder may contain conventional additives, e.g., antioxidants, light stabilizers, flow modifiers, co-stabilizer, etc., generally at a total level of about 10 phr or less.

Phosphonium bromide, a conventional type of catalyst used in epoxy/carboxylic acid coating powder systems, is found to destabilize coating powder compositions of this type when the combined epoxy plus carboxylic acid functionality is high. In accordance with the invention, catalysts of Formula (I) above are found to promote rapid, low-temperature cure of epoxy/carboxylic acid coating powders without destabilization of coating powders having high combined epoxy plus carboxylic acid functionality. Such catalysts are described in U.S. Pat. No. 3,859,379, the teachings of which are incorporated herein by reference. The cure catalysts are typically used at levels of between about 0.1 and about 2.0 phr.

Coating powders in accordance with the present invention are formed in a conventional manner. The components of the coating powder are combined and blended for not more than 15 minutes, to blend well. The blended materials are then extruded, typically in the range of 70–150° C. in a single screw (or twin screw extruder, allowed to cool, chipped, ground and screened to obtain a powder of appropriate particle size. Average particle size is typically 20–80 microns. Scalping at 100 mesh is typical to remove coarse particles. There is typically about 10% by weight of particles below 10 microns. The amount of material retained on a 325 mesh is typically between about 30 and 50 wt. %. The powder is then applied in a conventional manner, e.g., electrostatically, to a substrate. For purposes of the invention, electrostatic application of coating powder includes conventional methods, such as corona-discharge methods and tribocharging methods. The substrate is heated at the time of application and/or subsequently so that the coating particles melt, form a continuous film, and cure.

The coatings are applicable to conventional substrates, such as metal, e.g., steel or aluminum, various polymers. In addition, as one aspect of the invention, by addition of a suitable catalyst, the cure temperature of the composition may be 300° F. or below and even 250° F. or below, temperatures consistent with application of the coating powder compositions to wood or wood products. Of course cure is time-dependent as well as temperature dependent; however, a full cure must be achieved within a reasonable time. Thus, for purposes of this invention, a cure time of 30 minutes at the cure temperature to achieve a full cure is considered reasonable, and temperatures of at or below 300° F., preferably at or below 250 ° F., for 30 minutes to effect a full cure is considered acceptable for wood applications. A "full cure" is a degree of curing achieved at which additional time at elevated temperature will not improve the properties of the coating once cooled to ambient temperatures.

For purposes of this invention wood is define herein as any lignocellulosic material whether it comes from trees or other plants and whether it be in its natural forms or its fibers have been separated, felted, and compressed to form hardboard, medium density fiberboard, or the like. Particle board, whether standard or treated to enhance its electrical conductivity, and oriented strand board are also within the definition of wood for this invention. Wood having a moisture content of from about 3 to about 10% by weight are most suitable for purpose of this invention.

The invention will now be described in greater detail by way of specific examples.

EXAMPLES 1 (COMPARATIVE) AND 2

Coating powders were formulated as follows:

|  |  | Example 1 CONTROL | Example 2 |
|---|---|---|---|
| MORKOTE ® 460 | Carboxyl Polyester Acid Number 50 | 90 | 90 |
| PT-810 | TGIC | 10 | 10 |
| Resiflow P67 | Flow Control | 1.4 | 1.4 |
| TR-93 | $TiO_2$ | 40 | 40 |
| Ethyl triphenyl phosphonium bromide |  | 0.4* |  |
| Ethyl triphenyl phosphonium tetra phenyl borate |  |  | 1.0* |

*Because of the relative molecular weights of the anions, the amount of phosphonium ions is approximately the same, bus slightly higher for Example 2 in accordance with the invention. Higher catalyst levels, all else being equal, would be expected to result in lower stability.

Properties are as follows:

|  | Example 1 CONTROL ETHYL TRIPHENYL PHOSPHONIUM BROMIDE .4% | Example 2 ETHYL TRIPHENYL PHOSPHONIUM BORATE 1% |
|---|---|---|
| Initial Gel Time @ 300° F. | 85 sec | 156 sec |
| HPMF @ 300° F. | 30 mm | 38 mm |
| 16 Hours @ 90° F. |  |  |
| Gel Time @ 300° F. | 81 sec | 168 sec |
| HPMF @ 300° F. | 26 mm | 40 mm |
| 44 Hours @ 90° F. |  |  |
| Gel Time @ 300° F. | 60 sec | 163 sec |
| HPMF @ 300° F. | 22 mm | 36 mm |
| 70 Hours @ 90° F. |  |  |
| Gel Time @ 90° | | 148 sec |
| HPMF @ 300° F. | | 37 mm |
| CURE PROPERTIES |  |  |
| MEK Resistance 300° F.-5 Minutes | 4 | 4 |
| MEK Resistance 350° F.-5 Minutes | 5 | 5 |

|  | Example 3 Comparative | Example 4 |
|---|---|---|
| Ruco 911 | 70 | 70 |
| GMA 300 | 30 | 30 |
| Sebacic Acid | 10 | 10 |
| G-151 | 3 | 3 |
| Phosphonium Borate | — | 2 |
| Phosphonium Bromide | 1 | — |
| Resiflow P-67 | 2 | 2 |
| TR-93 | 20 | 20 |

Hot plate melt flow and gel time data for fresh powder and aged powder at 90° F.:

|  | HPMF @ 300° F. Ex.3 | GEL TIME @ 300° F. Ex.3 |
|---|---|---|
| Fresh Powder | 33 mm | 76 seconds |
| 15 Hours | 19 mm | 63 seconds |
| 42 Hours | 14 mm | 51 seconds |
|  | PHMF @ 300° F. Ex.4 | GEL TIME @ 300° F. Ex.4 |
| Fresh Powder | 72 mm | 109 seconds |
| 15 Hours | 65 mm | 121 seconds |
| 42 Hours | 60 mm | 145 seconds |

Physical characteristics on MDF for fresh powder and heat aged powder at 90° F. for 42 hours:

|  | GLOSS @ 60° Ex.3 | MEK RUB | SMOOTHNESS |
|---|---|---|---|
| Fresh Powder | 19 units | No Rub Off | No Orange Peel |
| Heat Aged Powder 90° F. - 42 Hours | 8 units | No Rub Off | Fine Texture |

|  | GLOSS @ 60° Ex.4 | MEK RUB | SMOOTHNESS |
|---|---|---|---|
| Fresh Powder | 18 units | No Rub Off | No Orange Peel |
| Heat Aged Powder 90° F. - 42 Hours | 10 units | No Rub Off | Ultra Smooth |

What is claimed is:

1. A coating powder, the resin system of said coating powder composition comprising:

A) an epoxy having an epoxy equivalent weight between about 200 and about 1000, and B) a carboxylic acid functional polymer having an acid number between about 20 and about 175, the stoichiometric ratio of the epoxy functionality of A) to the carboxylic acid functionality of B) being between about 0.7 and about 1.3, said resin system containing C) between about 0.1 and about 2.0 phr of a catalyst of the general formula (I):

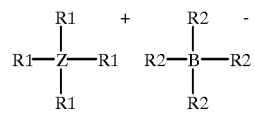

(I)

where Z is selected from P, As, and N, the R1s are the same or different and are independently selected from alkyl groups, alkenyl groups, and aryl groups, and the R2s are the same or different and are selected from alkyl groups, phenyl groups, substituted phenyl groups, Br, Cl, I, and F.

2. The coating powder according to claim 1 wherein Z is P.

3. The coating powder according to claim 1 wherein at least one $R_2$ is F.

4. The coating powder according to claim 1 wherein all R₂s are F.

5. The coating powder according to claim 1 wherein at least one R₂ is phenyl or a substituted phenyl.

6. The coating powder according to claim 1 wherein all R₂s are phenyl or substituted phenyls.

7. The coating powder according to claim 1 wherein the combined epoxy functionality of A) plus carboxylic acid functionality of B) is at least 7.

8. The coating powder according to claim 1 wherein the combined epoxy functionality of A) plus carboxylic acid functionality of B) is at least 10.

9. The coating powder according to claim 1 wherein the combined epoxy functionality of A) plus carboxylic acid functionality of B) is at least 12.

10. The coating powder according to claim 1 wherein said carboxylic acid functional polymer comprises a carboxylic acid functional polyester.

11. The coating powder according to claim 1 wherein said carboxylic acid functional polymer comprises a carboxylic acid functional acrylate.

12. The coating powder according to claim 1 wherein said epoxy resin comprises an acrylic polymer formed from monomers including glycidyl (meth)acrylate monomers.

* * * * *